US012425950B2

United States Patent
Nakarmi et al.

(10) Patent No.: US 12,425,950 B2
(45) Date of Patent: Sep. 23, 2025

(54) ROBUST NAS LAYER SIGNALING

(71) Applicant: Telefonaktiebolaget LM Ericsson (publ), Stockholm (SE)

(72) Inventors: Prajwol Kumar Nakarmi, Sollentuna (SE); George Foti, Dollard des Ormeaux (CA); Qian Chen, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 419 days.

(21) Appl. No.: 17/792,338

(22) PCT Filed: Jan. 12, 2021

(86) PCT No.: PCT/EP2021/050429
§ 371 (c)(1),
(2) Date: Jul. 12, 2022

(87) PCT Pub. No.: WO2021/144238
PCT Pub. Date: Jul. 22, 2021

(65) Prior Publication Data
US 2023/0121717 A1    Apr. 20, 2023

Related U.S. Application Data

(60) Provisional application No. 62/960,541, filed on Jan. 13, 2020.

(51) Int. Cl.
*H04W 48/02* (2009.01)
*H04W 60/04* (2009.01)

(52) U.S. Cl.
CPC .......... *H04W 48/02* (2013.01); *H04W 60/04* (2013.01)

(58) Field of Classification Search
CPC .............................. H04W 48/02; H04W 60/04
See application file for complete search history.

(56) References Cited

U.S. PATENT DOCUMENTS

| | | | |
|---|---|---|---|
| 2011/0159893 A1* | 6/2011 | Siomina | H04W 4/029 455/456.3 |
| 2013/0182644 A1* | 7/2013 | Kim | H04W 28/0215 370/328 |

(Continued)

FOREIGN PATENT DOCUMENTS

EP    3845029 A1 *    7/2021    ............ H04W 76/19

OTHER PUBLICATIONS

International Search Report and Written Opinion dated Mar. 15, 2021 in International Application No. PCT/EP2021/050429 (14 pages).

(Continued)

*Primary Examiner* — Mewale A Ambaye
(74) *Attorney, Agent, or Firm* — Rothwell, Figg, Ernst & Manbeck, P.C.

(57) ABSTRACT

Procedures are provided for robust handling of NAS request messages that contain a spurious information element (IE). The spurious information element could include a NAS message container containing a NAS message with the wrong procedure type, i.e., a procedure type that does not match the type of the parent NAS message. The spurious information elements could also include redundant IEs that are not necessary for the emergency services fallback request.

17 Claims, 20 Drawing Sheets

(56) References Cited

U.S. PATENT DOCUMENTS

| | | | | |
|---|---|---|---|---|
| 2016/0360336 | A1* | 12/2016 | Gross | H04W 4/025 |
| 2017/0318463 | A1* | 11/2017 | Lee | H04W 60/00 |
| 2018/0020382 | A1* | 1/2018 | Kim | H04W 36/0064 |
| 2021/0136635 | A1* | 5/2021 | Kim | H04W 80/02 |
| 2021/0211956 | A1* | 7/2021 | Kim | H04W 12/043 |
| 2023/0170968 | A1* | 6/2023 | Wang | H04B 7/0695 |
| | | | | 375/262 |
| 2023/0224952 | A1* | 7/2023 | Zheng | H04W 56/0045 |
| | | | | 370/329 |
| 2023/0247438 | A1* | 8/2023 | Yang | H04W 76/20 |
| | | | | 370/329 |

OTHER PUBLICATIONS

3GPP TS 24.501 V16.3.0, "3rd Generation Partnership Project; Technical Specification Group Core Network and Terminals; Non-Access-Stratum (NAS) protocol for 5G System (5GS); Stage 3 (Release 16)", 3GPP Standard; Technical Specification; 3GPP TS 24.501, 3RD Generation Partnership Project (3GPP), Mobile Competence Centre; Sophia-Antipolis Cedex, France, Dec. 20, 2019, XP051840838 (645 pages).

3GPP TS 23.501 V16.3.0, Technical Specification, 3rd Generation Partnership Project; Technical Specification Group Services and System Aspects; System architecture for the 5G System (5GS); Stage 2 (Release 16), Dec. 2019 (417 pages).

3GPP TS 33.501 V16.1.0, Technical Specification, 3rd Generation Partnership Project; Technical Specification Group Services and System Aspects; Security architecture and procedures for 5G system (Release 16), Dec. 2019 (202 pages).

3GPP TS 23.502 V16.3.0, Technical Specification, 3rd Generation Partnership Project; Technical Specification Group Services and System Aspects; Procedures for the 5G System (5GS); Stage 2 (Release 16), Dec. 2019 (558 pages).

* cited by examiner

ROBUST NAS LAYER SIGNALING

CROSS REFERENCE TO RELATED APPLICATION(S)

This application is a 35 U.S.C. § 371 National Stage of International Patent Application No. PCT/EP2021/050429, filed Jan. 12, 2021, which claims priority to U.S. Provisional Patent Application No. 62/960,541, filed Jan. 13, 2020. The above identified applications are incorporated by this reference.

TECHNICAL FIELD

The present disclosure relates generally to control signaling between a user equipment (UE) and a wireless communication network and, more particularly, to the handling of non-access stratum (NAS) signaling by an Access and Mobility Management Function (AMF).

BACKGROUND

In wireless communication networks, such as Fifth Generation (5G) network using the New Radio (NR) air interface, the non-access stratum (NAS) is a set of protocols for conveying signaling between a user equipment (UE) and the Access and Mobility Management Function (AMF). The AMF is a 5G core network (5GC) node responsible for mobility management of the UE among other things. One example of a NAS procedure is the Registration procedure. The registration procedure is initiated by the UE for registering with the 5G network. Within this procedure, the Registration Request (RR) message is a NAS message sent by UE to AMF in order to get authorized to receive services, to enable mobility tracking and to enable reachability. Another example of a NAs procedure is the Service Request procedure. The Service Request procedure is used by the UE to request the establishment of a secure connection to an AMF. Within this procedure, the Service Request (SR) message is a NAS message sent by UE to AMF in order to request the establishment of an NAS signaling connection and/or to request the establishment of user-plane resources.

In 5G, some privacy enhancements were done regarding the content of NAS messages like RR and SR. One of those privacy enhancements is that only minimal information is sent in clear-text and as much information as possible is sent encrypted. The information that is sent encrypted is carried in an information element (IE) called NAS message container whose purpose is to encapsulate a plain NAS message. Whenever the UE has a NAS security context and needs to send some encrypted (or non-clear text) information, the UE includes the NAS message container IE in the NAS message like RR and SR. This NAS message container IE can contain either a RR message or a SR message that will ultimately contain the encrypted information that the UE needed to send.

Another important feature in 3GPP networks is Emergency service which refers to functionalities provided by the serving network when the network is configured to support Emergency Services. In order to be able to provide robust emergency service, there is also a feature called emergency fallback to direct or redirect the UE when the 5GC does not support Emergency Services. In order to have access to emergency services, the UE can fallback to an Evolved Universal Terrestrial Radio Access (E-UTRA) base station connected to the 5GC (Radio Access Technology (RAT) fallback) when only NR does not support emergency services, or to an E-UTRA base station connected to a Evolved Packet System (EPS) network (EPS fallback) when the 5GC does not support emergency services. The indication of emergency services fallback is contained in the SR message in an IE called Service type.

One concern with NAS signaling is handling of NAs signaling message containing spurious information elements (IEs). Spurious IEs can result in undesirable processing delays, which is of particular concern when emergency services are invoked. Additionally, spurious IEs inserted into NAS signaling by a malicious third party presents a security risk to the network.

SUMMARY

The present disclosure relates to procedures for robust handling of NAS request messages that contain a spurious information element (IE). The spurious information element could comprise a NAS message container containing a NAS message with the wrong procedure type, i.e. a procedure type that does not match the type of the parent NAS message. The spurious information elements could also comprise redundant IEs that are not necessary for the emergency services fallback request.

According to a general aspect of the disclosure, handling procedures are provided for handling a NAS message including a NAS message container containing another NAS message. When an AMF receives a NAS message including a NAS message container, the AMF processes the child message in the NAS message container only when a type of the child NAS message matches a type of the parent NAS message. When a type of the child NAS message does not match a type of the parent NAS message, the AMF may ignore or discard the child NAS message, ignore or discard the entire NAS message, or send an error message to the UE.

According to another general aspect of the disclosure, handling procedures are provided for handling a NAS message including an emergency services fallback indication. When the AMF receives a services request message including an emergency services fallback indication, the AMF does not process spurious or extra IEs in the service request message. When the service request message includes a spurious IE the AMF may ignore or discard the spurious IE, ignore or discard the entire NAS message, or send an error message to the UE.

According to a first, more specific, aspect of the disclosure, a method is implemented by a user equipment, UE, for sending a non-access stratum, NAS, message to a core network node in a wireless communication network. The message comprises determining whether a NAS request message contains a spurious information element and allowing transmission of the NAS request message responsive to determining that it does not contain a spurious information element. It further comprises prohibiting transmission of the NAS request message responsive to determining that it does not contain a spurious information element.

According to a second aspect of the disclosure, a method is implemented by a user equipment, UE, in a wireless communication network for sending a non-access stratum, NAS, message to a core network node in a wireless communication network. The method comprises the UE transmitting a NAS request message to a core network node in the wireless communication network, and receiving, responsive to the NAS request message, a NAS response message from the core network node with an error indication. Further, responsive to the error indication, the UE transmits a modified NAS request message.

According to a third aspect of the disclosure, a method is implemented by a core network node in a wireless communication network for receiving non-access stratum, NAS, messages. The method comprises receiving, from a user equipment, UE, a NAS request message and processing the NAS request message according to a normal handling procedure when the NAS request message does not contain a spurious information element, but processing the NAS request message according to a special handling procedure when the NAS request message contains a spurious information element.

According to a fourth aspect of the disclosure, a user equipment in a wireless communication network is provided, said user equipment comprising communication circuitry configured for communication via a base station with a core network node, and processing circuitry. The processing circuitry is configured to determine whether a non-access stratum, NAS, request message contains a spurious information element, and allow transmission of the NAS request message responsive to determining that it does not contain a spurious information, but prohibit transmission of the NAS request message responsive to determining that it does not contain a spurious information element.

According to a fifth aspect of the disclosure, a user equipment in a wireless communication network is provided. The user equipment is configured to determine whether a non-access stratum, NAS, request message contains a spurious information element, allow transmission of the NAS request message responsive to determining that it does not contain a spurious information element, but prohibit transmission of the NAS request message responsive to determining that it does not contain a spurious information element.

According to a sixth aspect of the disclosure, a user equipment in a wireless communication network is provided. The user equipment comprises communication circuitry configured for communication via a base station with a core network node, and processing circuitry. The processing circuitry is configured to transmit a non-access stratum, NAS, request message to a network node in the wireless communication network, to receive, responsive to the NAS request message, a NAS response message from the network node with an error indication, and to transmit, responsive to the error indication, a modified NAS request message.

According to a seventh aspect of the disclosure, a user equipment in a wireless communication network is provided. The user equipment is configured to transmit a non-access stratum, NAS, request message to a core network node in the wireless communication network, to receive, responsive to the NAS request message, a NAS response message from the core network node with an error indication, and to transmit, responsive to the error indication, a modified NAS request message.

According to an eighth aspect of the disclosure, a core network node in a wireless communication network is provided. The core network node comprises communication circuitry configured for communication with a user equipment, UE, via a base station in the wireless communication network, and processing circuitry. The processing circuitry is configured to receive, from a UE, a non-access stratum, NAS, request message, to process the NAS request message according to a normal handling procedure when the NAS request message does not contain a spurious information element, but to process the NAS request message according to a special handling procedure when the NAS request message contains a spurious information element.

According to a ninth aspect of the disclosure, a core network node in a wireless communication network is provided. The core network node is configured to receive, from a user equipment, UE, a non-access stratum, NAS request message, to process the NAS request message according to a normal handling procedure when the NAS request message does not contain a spurious information element, but to process information element, but to process the NAS request message according to a special handling procedure when the NAS request message contains a spurious information element.

Advantageously, these aspects enable an improved handling of NAS signaling messages containing spurious information elements (IEs), by reducing undesirable processing delays, as well as the security risk from malicious third parties.

DETAILED DESCRIPTION

Figure 1:
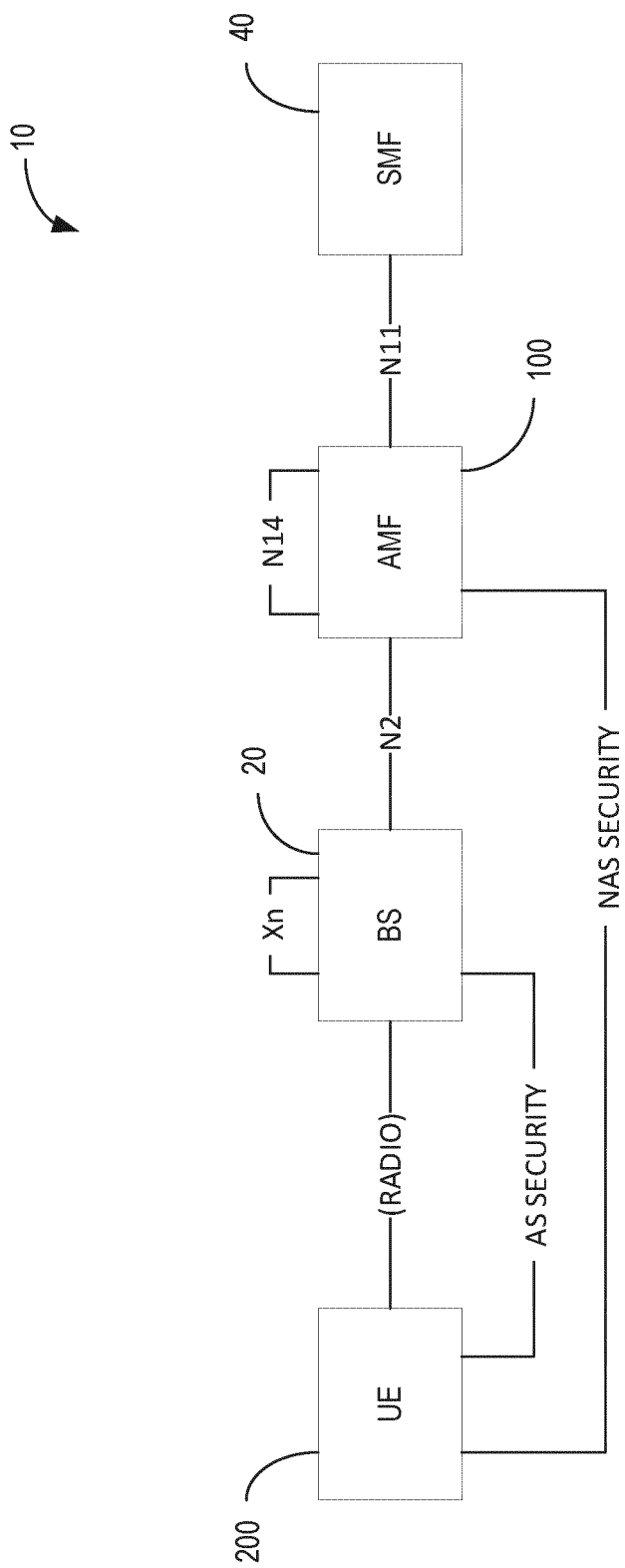
FIG. 1 illustrates an exemplary communication network according to an embodiment.

Referring now to the drawings, an exemplary embodiment of the disclosure will be described in the context of a Fifth Generation (5G) wireless communication network implementing the New Radio (NR) air interface. Those skilled in the art will appreciate that the methods and apparatus herein described are not limited to use in 5G networks but are more generally applicable to any wireless communication network using NAS signaling between a UE and an AMF or other mobility management entity.

FIG. 1 illustrates in simplified form a 5G network 10. The 5G network 10 comprises one or more base stations 20 providing service to UEs 200 in respective cells of the wireless communication network 10. Base stations 20 that connect to the 5G core network (5GC) and support the NR interface are also referred to 5G NodeBs (gNBs). Base stations 20 that connect to the 5GC and support the E-UTRA interface are referred to as Next Generation Evolved NodeBs (ng-eNBs). Although only one base station 20 is shown in FIG. 1, those skilled in the art will appreciate that a typical wireless communication network 10 comprises many cells and many base stations 20. The base stations 20 are collectively called the Next Generation Radio access network (NG-RAN) in 5G architecture.

The UEs 200 may comprise any type of equipment capable of communicating with the base station 20 over a wireless communication channel. For example, the UEs 200 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

A core network function called the Access and Mobility Management Function (AMF) 100 is responsible for handling the mobility of the UE 200, among other responsibilities. Another core network function called the Session Management Function (SMF) 30 is responsible for handling the session and traffic steering of the UE 200, among other responsibilities. The UE 200 interacts with the base station 20 over-the-air using the NR air interface. The base station 20 in turn interacts with the AMF 100 using the interface called the N2. The N2 interface is also known an NG interface. The interface between the AMF 100 and the SMF is called the N11. The base stations 20 interact with each other using the Xn interface. Similarly, the AMFs 100 interact with each other using the N14 interface. What is not shown in the diagram is that the base station in 5G radio access network could also be what is called a Next Generation eNB(ng-eNB) that supports E-UTRA.

The logical aspects between the UE 200 and the AMF 100 is referred to as non-access stratum (NAS) and that between the UE 200 and the base station 20 is referred to as access stratum (AS). Correspondingly, the security of communication (control plane and user plane, if applicable) are referred to as NAS security and AS security, respectively. When a state of security is established between the UE 200 and the AMF 100, both of them store the relevant security data, e.g., NAS security key, security key identifier, security capabilities, various counters, etc. Such a state of security between the UE 200 and the AMF 100 including the security data is referred to as NAS security context. Similarly, the AS security context refers to the state of security including security data between the UE 200 and the base station 20. The AS security context is derived from the NAS security context.

The Registration Procedure is one type of NAS procedure initiated by the UE 200 for registering with the 5G network. Within this procedure, the Registration Request (RR) message is a NAS message sent by UE 200 to AMF 100 in order to get authorized to receive services, to enable mobility tracking and to enable reachability. The Service Request procedure is another type of NAS signaling used by the UE 200 to request the establishment of a secure connection to an AMF 100. Within this procedure, the Service Request (SR) message is a NAS message sent by UE 200 to AMF 100 in order to request the establishment of an NAS signaling connection and/or to request the establishment of user-plane resources. Further details about these NAS procedures and messages can be found in 3GPP TS 23.502 v.16.3.0, and TS 24.501 v.16.3.0.

In 5G, some privacy enhancements were done regarding the content of NAS messages like the RR and SR. One of those privacy enhancements is that only minimal information is sent in clear-text and as much information as possible is sent encrypted. The information that is sent encrypted is carried in an information element (IE) called NAS message container whose purpose is to encapsulate a plain NAS message. Whenever the UE 200 has a NAS security context and needs to send some encrypted (or non-clear text) information, the UE 200 includes the NAS message container IE in the NAS message like RR and SR. This NAS message container IE can contain either a RR message or a SR message that will ultimately contain the encrypted information that the UE 200 needed to send. Further details about this privacy enhancement and use of NAS message container IE can be found in 3GPP 33.501 v.16.1.0, and TS 24.501 v.16.3.0.

One area of concern is when a child message in a NAS message container is a different type than the parent message, referred to herein as the procedure mix problem. The 3GPP standard specifies that the Service Request procedure is aborted by the UE 200 when Registration procedure is initiated. The 3GPP standards also define that the network treats the child NAS message in the NAS message container instead of parent NAS message. However, 3GPP standards still allow the NAS message container to contain either the RR message or the SR message (child NAS message). The standards do not specify how to handle a procedure mix when the child/parent NAS messages of different types. One example of this procedure mix problem is how to handle an SR message that includes a NAS message container containing a RR message. Another example of this procedure mix problem is how to handle an RR message that includes a NAS message container containing a SR message. The SR message belongs to Service Request procedure and the RR message belongs to Registration procedure.

This procedure mix problem could lead to many undesirable effects. For example, the procedure mix could cause an undesirable delay in processing the message or produce inadvertent or unintended results. Also, a malicious third party could try to trigger fault/crash in the network node by sending incompatible parent and child NAS messages such as a RR child message inside a SR parent message and vice-versa. The network processing logic may fail, or unnecessary delay may occur due to wasteful signaling.

Handling of emergency services fallback indicated by an SR message sent by the UE 200 and received by the AMF 100 is another area of concern. Since emergency service is a regulatory service, it is important to handle requests for emergency services without delay. Spurious information elements not necessary for invoking emergency fallback services could potentially delay the emergency services fall back request. Therefore, it is a challenge to handle several types of requests/features that could be requested by the UE 200 in the SR message while also indicating emergency services fallback.

One aspect of the present disclosure is to provide procedures for handling of NAS request messages that contain a spurious information element (IE). The spurious information element could comprise a NAS message container containing a NAS message with the wrong procedure type, i.e. a procedure type that does not match the type of the parent NAS message. The spurious information elements could also comprise redundant IEs that are not necessary for the emergency services fallback request.

Robust Handling of NAS Message Including A NAS Container Network/AMF 100 Behavior:

A properly implemented 3GPP-compliant UE 200 will most likely behave as it should according to the 3GPP standard. However, the 3GPP standard will likely not be followed by the UE 200 of a malicious third party. The AMF 100 behavior outlined below protects the network from malicious attacks and from poorly implemented UEs.

The AMF 100 handles NAS messages with a procedure mix according to predetermined handling information. The handling information could be defined as standardized AMF 100 behavior in one or more 3GPP technical specifications like 3GPP TS 24.501 v.16.3.0, TS 23.502 v.16.3.0, TS 23.501 v.16.3.0, or TS 33.501 v.16.1.0. The handling information could alternatively, be obtained by the AMF 100 from another 3GPP network function, such as the SMF, or a non-3GPP network function, such as an O&M node, or from a local file or a database. The handling information could also be obtained by the AMF 100 from the UE 200, for example, as a new IE in the RR or the SR message or a NAS Security Mode Complete message, indicating what the UE 200 wants the AMF 100 to do.

Figure 2:
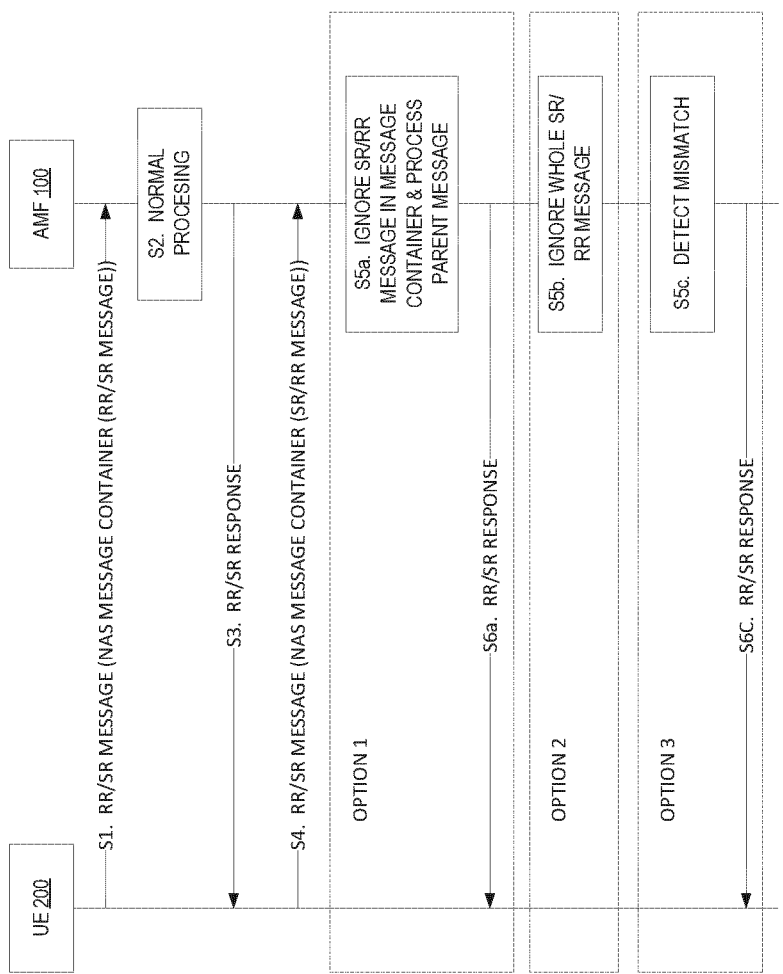
FIG. 2 illustrates procedures for handling a NAS service request or registration request message including a message container.

FIG. 2 illustrates a procedure for handling a NAS message that includes a NAS message container with another NAS message of a different type. At S1, the AMF 100 receives a RR or SR message with a NAS message container that includes NAS message of the same type. In this case, the AMF 100 applies normal processing to the received message (S2) and provides a response dependent on the results (S3). The response, for example, may indicate success, or reject the message with an indication of the cause. At S4, the AMF 100 receives a RR or SR message with a NAS message container that includes a NAS message of a different type e.g., SR message in container of RR message or RR message in container of SR message. FIG. 2 illustrates different approaches for handling a NAS message that includes a NAS message container with another NAS message of a different type.

In first approach, the AMF 100 is configured to ignore the NAS message contained in a NAS message container and process the parent message if a type of the child NAS message is different than the type of the parent NAS message (S5*a*). For example, when receiving a RR message that includes a NAS message container, the AMF 100 takes into account the NAS message container if it contains an RR message and ignores and does not take into account the NAS message container if it contains an SR message. It is prudent to do so because this is an incompatible mix of procedures. Similarly, when receiving a SR message that includes a NAS message container, the AMF 100 takes into account the NAS message container if it contains an SR message and ignores or does not take into account the NAS message container if it contains an RR message. It is prudent to do so because this is an incompatible mix of procedures. After processing the parent NAS message, the AMF 100 sends a response dependent on the results of the processing (S6*a*).

In a second approach, the AMF 100 could alternatively ignore a RR or SR message that includes a NAS message container containing a SR and a RR message respective (S5*b*). In this case, the AMF 100 does not respond and acts as if the message was not received. The AMF 100 could also log such event and pass the information to other 3GPP or non-3GPP network functions. In a third approach, the AMF 100 could alternatively detect the mismatch and send an error message to the UE 200 if it receives a RR or SR message that includes a NAS message container containing a SR and a RR message (S5*c* & S6*c*). For example, the AMF 100 could send a Registration Reject message or a Registration Reject message. The AMF 100 could also log such event and pass the information to other 3GPP or non-3GPP network functions. In one embodiment, the error message includes a new error indication indicating a type mismatch between the child NAS message and the parent NAS message.

UE 200 Behavior:

A properly implemented 3GPP-compliant UE 200 should be configured to avoid the procedure mix problem when sending a NAS message including a NAS message container that contains another NAS message. The UE 200 handles NAS message containers according to predetermined handling information. The handling information could be defined as standardized AMF 100 behavior in one or more 3GPP technical specifications like 3GPP TS 24.501 v.16.3.0, TS 23.502 v.16.3.0, TS 23.501 v.16.3.0, or TS 33.501 v.16.1.0. as indicated above. Alternatively, the handling information could be indicated by the network to the UE 200 in a security protected NAS message belonging to current or earlier session. For example, the AMF 100 could send the information to UE 200 in a NAS Security Mode Command message or a Registration Accept message. The handling information could also be indicated by the network to the UE 200 in any other message. For example, the base station 20 could broadcast the information to UE 200 in a System Information (SI) message.

When sending a NAS message including a NAS message container, the UE 200 takes measures to prevent a procedure mismatch between the parent NAS message and the child NAS message. When sending a RR message that needs to include a NAS message container, the UE 200 makes sure that the NAS message container contains the RR message and does not contain the SR message. Similarly, when sending a SR message that needs to include a NAS message container, the UE 200 makes sure that the NAS message container contains the SR message and does not contain the RR message. It is prudent to do so because this is an incompatible mix of procedures.

Robust Handling of NAS MESSAGE INCLUDING Emergency Services Fallback Indication AMF 100/Network Behavior:

A properly implemented 3GPP-compliant UE 200 will most likely behave as it should according to the 3GPP standard. However, the 3GPP standard will likely not be followed by the UE 200 of a malicious third party. The AMF 100 behavior outlined below protects the network from malicious attacks and from poorly implemented UEs.

The AMF 100 handles NAS messages with an emergency services fallback indication according to predetermined handling information. The handling information could be defined as standardized AMF 100 behavior in one or more 3GPP technical specifications like 3GPP TS 24.501 v.16.3.0, TS 23.502 v.16.3.0, TS 23.501 v.16.3.0, or TS 33.501 v.16.1.0. as indicated above. The handling information could alternatively, be obtained by the AMF 100 from another 3GPP network function, such as the SMF, or anon-3GPP network function, such as an O&M node, or from a local file or a database. The handling information could be obtained by the AMF 100 from the UE 200, for example, as a new IE in the RR or the SR message or a NAS Security Mode Complete message, indicating what the UE 200 wants the AMF 100 to do.

Figure 3:
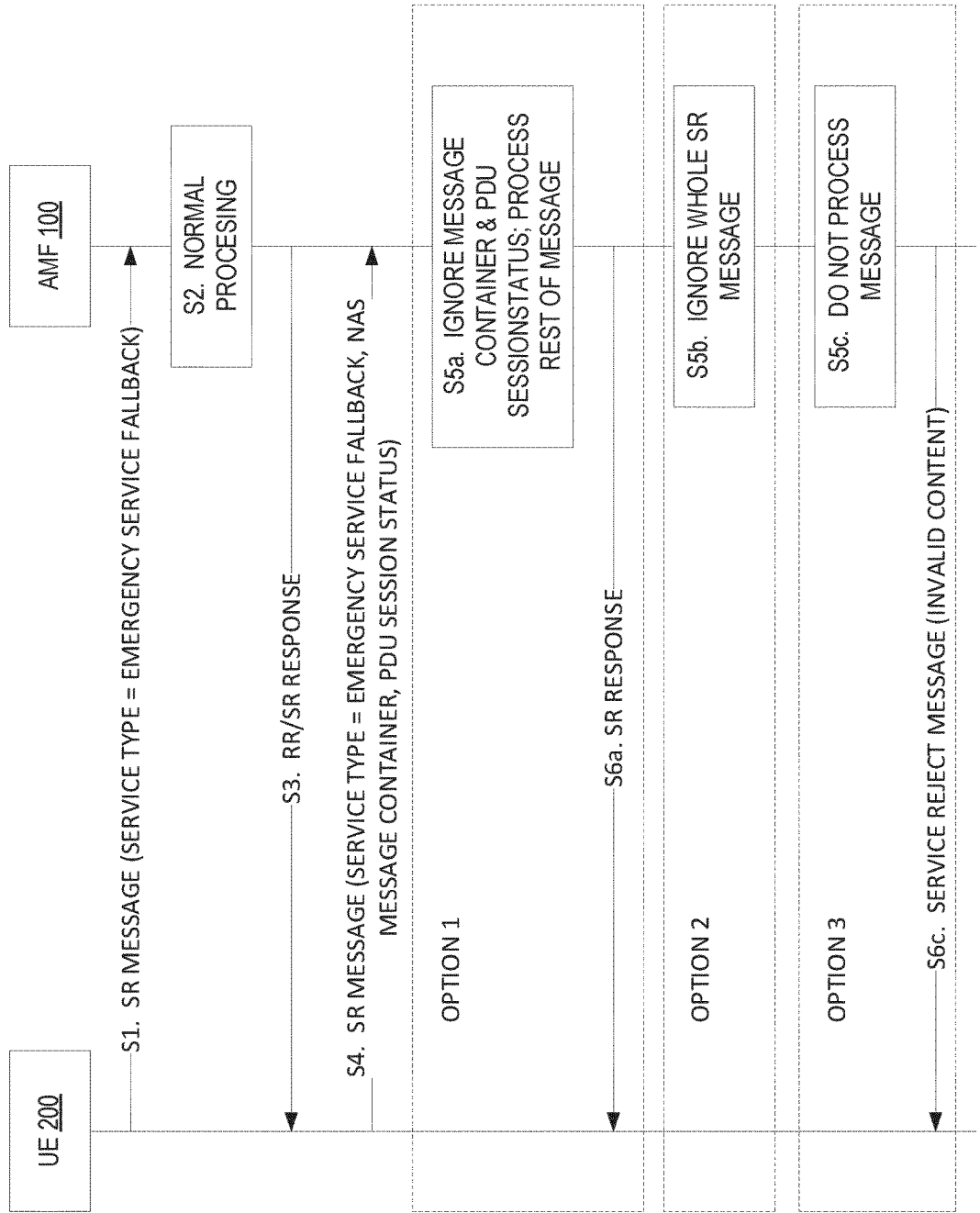
FIG. 3 illustrates procedures for handling a NAS service request message including an emergency service fallback indication

FIG. 3 illustrates a procedure for handling a NAS message that includes an emergency services fallback indication. At S1, the AMF 100 receives a SR message with an emergency service fallback indication that does not contain any extra or spurious IEs. In this case, the AMF 100 applies normal processing to the received message (S2) and provides a response dependent on the results (S3). The response, for example, may indicate success, or reject the message with an indication of the cause. At S4, the AMF 100 receives a SR message with an emergency service fallback indication that contains extra or spurious IEs. In the example shown in FIG. 3, the SR message includes a NAS message container and a PDU Session Status IE that are not relevant to emergency service fallback. FIG. 3 illustrates different approaches for handling a NAS message that includes a NAS message container with another NAS message of a different type.

According to a first approach, when receiving the SR message where the service type is about emergency service fallback, the AMF 100 ignores or does not handle any IEs that are not to be taken into account for emergency service fallback (S5a) and sends a response depending on a result of the processing (S6a). A user initiating an emergency service fallback is typically in a distress situation and any unrelated IEs (for other services) included in such a request will not be used anyway.

According to a second approach, when receiving a SR message indicating emergency service fallback and containing the IEs that are not to be taken into account for emergency service fallback, the AMF 100 ignores the entire SR message (S5b). In this case, the AMF 100 does not send a response and acts as if the message was not received. The AMF 100 could also log such event and pass the information to other 3GPP or non-3GPP network functions.

According to a third approach, when receiving a SR message indicating emergency service fallback including IEs that are not to be taken into account for emergency service fallback, the AMF 100 detect the spurious IEs (S5c) sends a response message indicating an error (S6c). For example, the AMF 100 could send a Service Reject message or a response message with an error indication indicating a protocol violation. In the example shown in FIG. 3, the NAS message container and PDU Session Status IE are not relevant to emergency service fallback so an error indication is sent to the UE 200. In one embodiment, the error message includes a new error indication indicating the presence of unnecessary (extra) or spurious IEs in the service request message.

The AMF 100 could also log such event and pass the information to other 3GPP or non-3GPP network functions.

The IEs that will not be taken into account for emergency service fallback can include one or more of the following:

An IE called the NAS message container. This is prudent because this IE is only needed if any optional information or IE need to be sent protected.

An IE called the PDU Session Status. This is prudent because that IE is only needed in case when the UE 200 wants to synchronize PDU Session Status information with network and such synchronization is not needed during emergency fallback operation (i.e., it could be done after emergency fallback operation).

An IE called Uplink Data Status. This is prudent because that IE is only needed in case when the UE 200 wants to send uplink data on certain PDU sessions without user plane. In emergency fallback case, this is not needed during emergency fallback operation (i.e., it could be done after emergency fallback operation).

An IE called Allowed PDU Session Status. This is prudent because that IE is only needed only in case UE 200 wants to move certain PDU sessions from non-3GPP access to 3GPP access. In emergency fallback case, this is not needed during emergency fallback operation (i.e., it could be done after emergency fallback operation).

All the optional IEs in the SR message. This is prudent because all the optional IEs are not essential for the emergency fallback operation.

Figure 4:
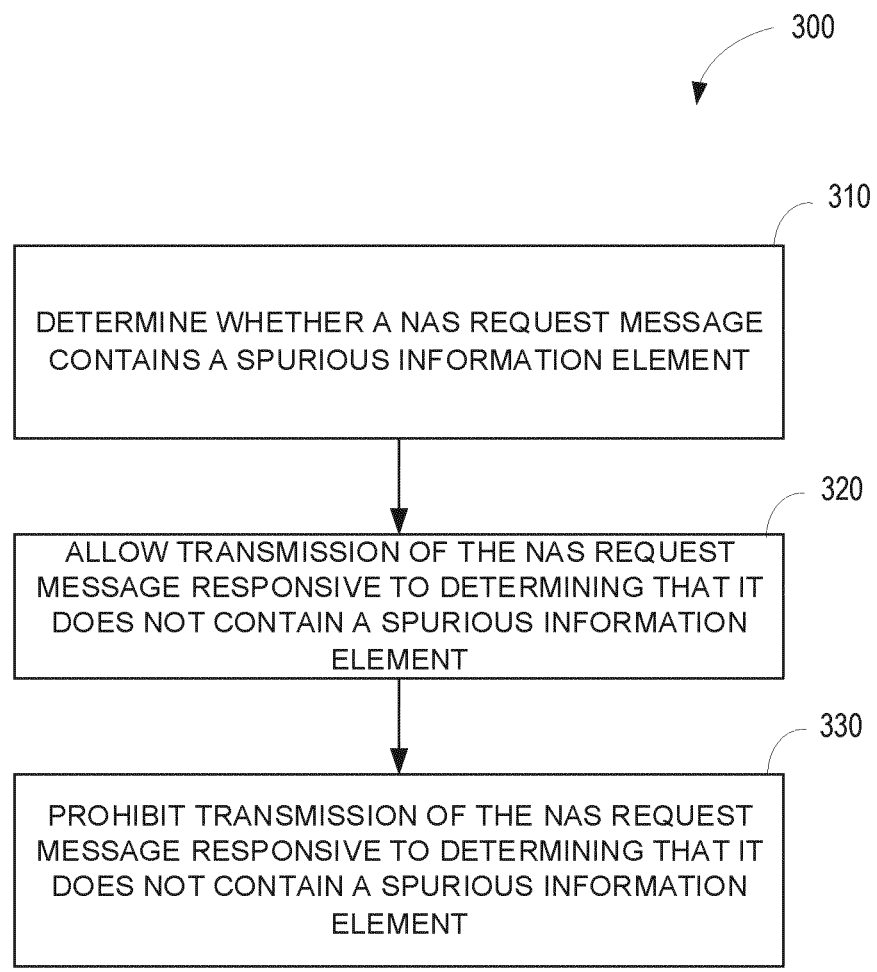
FIG. 4 illustrates a method of NAS signaling implemented by a UE.

Device/UE 200 Behavior:

A properly implemented 3GPP-compliant UE 200 should be configured to avoid inclusion of extra or spurious IEs in a SR message that includes an emergency service fallback indication. The UE 200 handles NAS message containers according to predetermined handling information. The handling information could be defined as standardized AMF 100 behavior in one or more 3GPP technical specifications like above mentioned 3GPP TS 24.501, TS 23.502, TS 23.501, or TS 33.501. Alternatively, the handling information could be indicated by the network to the UE 200 in a security protected NAS message belonging to current or earlier session. For example, the AMF 100 could send the information to UE 200 in a NAS Security Mode Command message or a Registration Accept message. The handling information could also be indicated by the network to the UE 200 in any other message. For example, the base station 20 could broadcast the information to UE 200 in a System Information (SI) message. When sending the SR message where the service type is about emergency service fallback, the UE 200 does not include any IEs that will not be taken in account for emergency service fallback. The IEs that will not be taken into account for emergency service fallback could be similar to the ones earlier described for AMF 100. The UE 200 determines whether a NAS request message contains a spurious information element. The UE 200 allows transmission of the NAS request message responsive to determining that it does not contain a spurious information element. The UE 200 prohibiting transmission of the NAS request message responsive to determining that it does not contain a spurious information element FIG. 4 illustrates an exemplary method 300 implemented by UE 200 of sending a non-access stratum message to a network node in a wireless communication network 10. The UE 200 determines whether a NAS request message contains a spurious information element (block 310). The UE 200 further allows the transmission of the NAS request message responsive to determining that it does not contain a spurious information element (block 320). The UE 200 prohibits transmission of the NAS request message responsive to determining that it does not contain a spurious information element (block 330).

In some embodiments of the method 300, the NAS request message comprises a first NAS request message with a message container containing a second NAS request message. The transmission of the NAS request message is allowed when a type of the second NAS request message matches a type of the first NAS request message. The transmission of the NAS request message is prohibited when a type of the second NAS request message does not match a type of the first NAS request message.

In some embodiments of the method 300, the first NAS request message comprises a service request message and the second NAS request message comprises a registration request message.

In some embodiments of the method 300, the first NAS request message comprises a registration request message and the second NAS request message comprises a service request message.

In some embodiments of the method 300, the received NAS request message comprises a service request message with an emergency service fallback indication. The transmission of the service request message is allowed when the service request message does not contain a spurious information element. The transmission of the service request message is prohibited when the service request message contains a spurious information element.

In some embodiments of the method 300, the spurious information element comprises one of a NAS (non-access stratum) container, a PDU (Protocol Data Unit) Session Status IE (information element), an Uplink Data Status IE, an Allowed PDU Session Status IE, or an optional IE.

Figure 5:
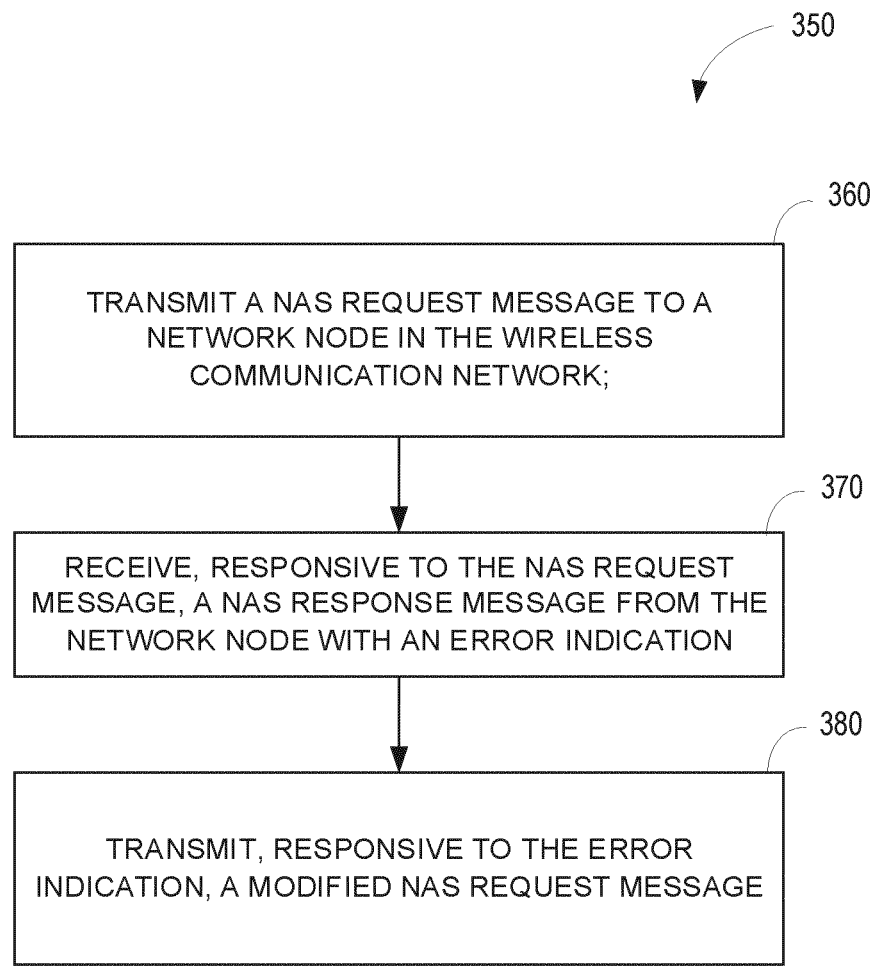
FIG. 5 illustrates another method of NAS signaling implemented by a UE.

FIG. 5 illustrates another method 350 implemented by a UE 200 in a wireless communication network of sending a NAS (non-access stratum) message to a network node in a wireless communication network. The UE 200 transmits a NAS request message to a network node in the wireless communication network (block 360). The UE 200 receives, responsive to the NAS request message, a NAS response message from the network node with an error indication (block 370). The UE recognizes the error indication and transmits, responsive to the error indication, a modified NAS request message (block 380).

In some embodiments of the method 350 the NAS request message includes a NAS message container with an encapsulated NAS request message and wherein the error indication indicates a type mismatch between the NAS message and the encapsulated NAS message container with the NAS message container.

In some embodiments of the method 350, the NAS request message includes a NAS message container with an encapsulated NAS request message and wherein the error indication indicates a protocol violation.

Figure 6:
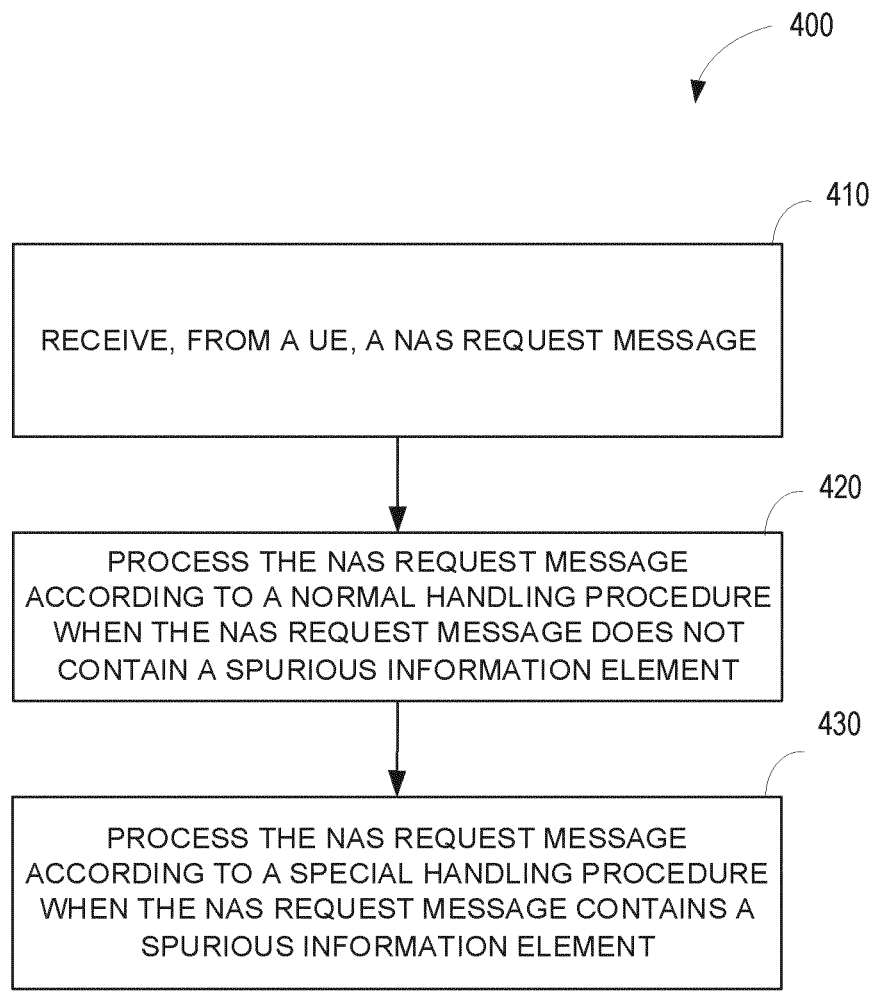
FIG. 6 illustrates a method of NAS signaling implemented by a network node (e.g. AMF) of configuring measurement reporting for a UE.

FIG. 6 illustrates a method 400 performed by a base station 20 or other network node. The base station 20 receives, from a UE 200 a NAS request message (block 410). The base station 20 processes the NAS request message according to a normal handling procedure when the NAS request message does not contain a spurious information element (block 420). The base station 20 processes the NAS request message according to a special handling procedure when the NAS request message contains a spurious information element (block 430).

In some embodiments of the method 400, the received NAS request message comprises a first NAS request message with a message container containing a second NAS request message. The first NAS request message is processed according to the normal handling procedure when a type of the second NAS request message matches a type of the first NAS request message. The first NAS request message is processed according to the special handling procedure when a type of the second NAS request message does not match a type of the first NAS request message.

In some embodiments of the method 400, processing the first NAS request message according to the special handling procedure comprises processing the first NAS request message while ignoring or discarding the NAS request message container.

In some embodiments of the method 400, the first NAS request message comprises a registration request message and the second NAS request message comprises a service request message.

In some embodiments of the method 400, the first NAS request message comprises a service request message and the second NAS request message comprises a registration request message.

In some embodiments of the method 400, the NAS request message container is encrypted.

In some embodiments of the method 400, the first NAS request message according to the special handling procedure comprises ignoring or discarding the first NAS request message.

In some embodiments of the method 400, processing the first NAS request message according to the special handling procedure comprises sending, to the UE 200, a NAS response message with an error indication.

In some embodiments of the method 400, the error indication indicates a type mismatch between the first NAS request message and the second NAS request message.

In some embodiments of the method 400, the received NAS request message comprises a service request message with an emergency service fallback indication. The service request message is processed according to the normal handling procedure when the service request message does not contain a spurious information element. The service message is processed according to a special handling procedure when the service request message contains a spurious information element.

In some embodiments of the method 400, the spurious information element comprises one of a NAS container, a PDU Session Status IE, an Uplink Data Status IE, an Allowed PDU Session Status IE, or an optional IE.

In some embodiments of the method 400, processing the service request message according to the special handling procedure comprises processing the received NAS request message while ignoring or discarding the spurious information element.

In some embodiments of the method 400, processing the service request message according to a special handling procedure comprises ignoring the service request message.

In some embodiments of the method 400, processing the service request message according to a special handling procedure further comprises sending, to the UE 200, a response message with an error indication when the service request message contains a spurious information element.

Some embodiments of the method 400 further comprise logging the service request message in an event log when the service request message contains a spurious information element.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
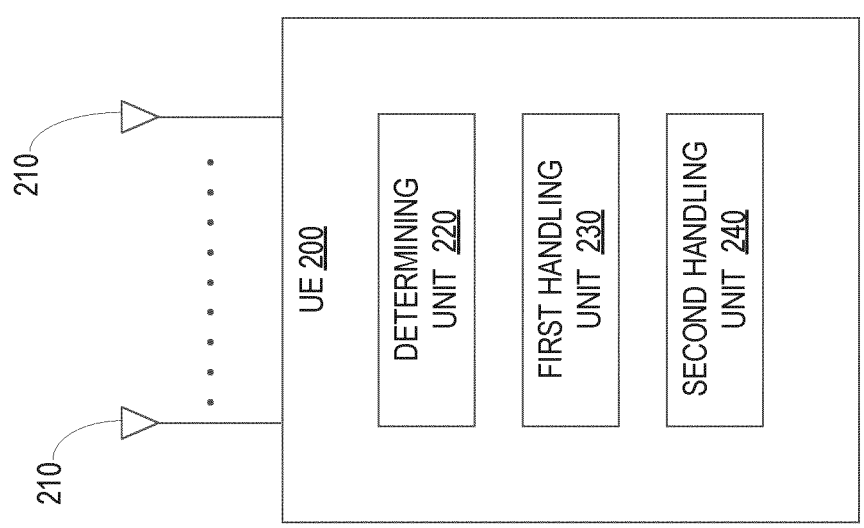
FIG. 7 is a schematic block diagram of an exemplary UE configured to implement NAS signaling as herein described.

FIG. 7 illustrates a UE 200 in accordance with one or more embodiments for handling NAS messages including a NAS message container. The UE 200 comprises one or more antennas 210, a determining unit 220, a first handling unit 230 and a second handling unit 240. The various units 220-240 can be implemented by hardware and/or by software code that is executed by one or more processors or processing circuits. The determining 220 is configured to determine whether a NAS request message contains a spurious information element. The first handling unit 230 is configured to allow transmission of the NAS request message responsive to determining that it does not contain a spurious information element. The second handling unit 240 is configured to prohibit transmission of the NAS request message responsive to determining that it does not contain a spurious information element.

Figure 8:
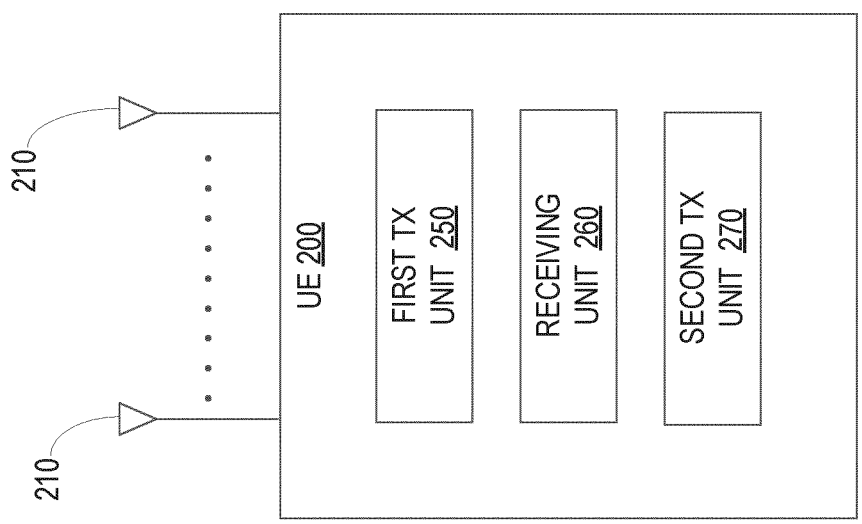
FIG. 8 is a schematic block diagram of an exemplary UE configured to implement NAS signaling as herein described.

FIG. 8 illustrates UE 200 in accordance with another embodiments for handling NAS messages including an emergency services fallback indication. The UE 200 comprises one or more antennas 210, a first transmitting (TX) unit 250, a receiving unit 260 and a second transmitting (TX) unit 270. The various units 250-270 can be implemented by hardware and/or by software code that is executed by one or more processors or processing circuits. The first transmitting 250 is configured to transmit a NAS request message to a network node in the wireless communication network. The receiving unit 260 is configured receive, responsive to the NAS request message, a NAS response message from the network node with an error indication. The second transmitting unit 270 is configured to transmit, responsive to the error indication, a modified NAS request message.

Figure 9:
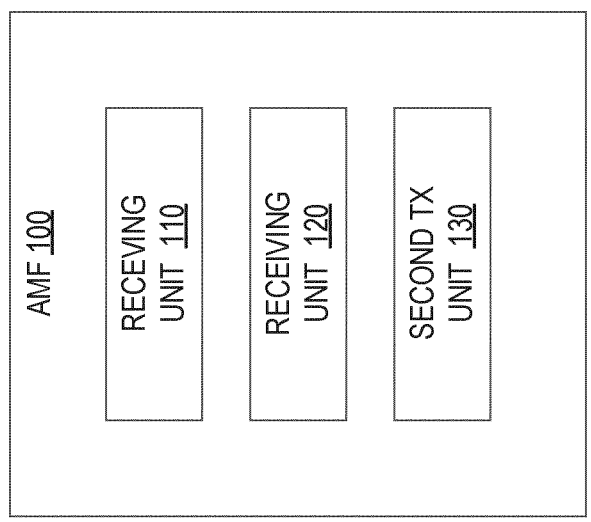
FIG. 9 is a schematic block diagram of an exemplary core network node (e.g. AMF) configured to implement NAS signaling as herein described.

FIG. 9 illustrates a network node (e.g. AMF 100) in accordance with one or more embodiments. The AMF 100 comprises a receiving unit 110, a first handling unit 120, and a second handling unit 130. The various units 110-130 can be implemented by hardware and/or by software code that is executed by a processor or processing circuit. The receiving unit 110 is configured to receive, from a user equipment (UE 200), a NAS request message. The first handling unit 120 is configured to process the NAS request message according to a normal handling procedure when the NAS request message does not contain a spurious information element. The second handling unit 130 is configured to process the NAS request message according to a special handling procedure when the NAS request message contains a spurious information element.

Figure 10:
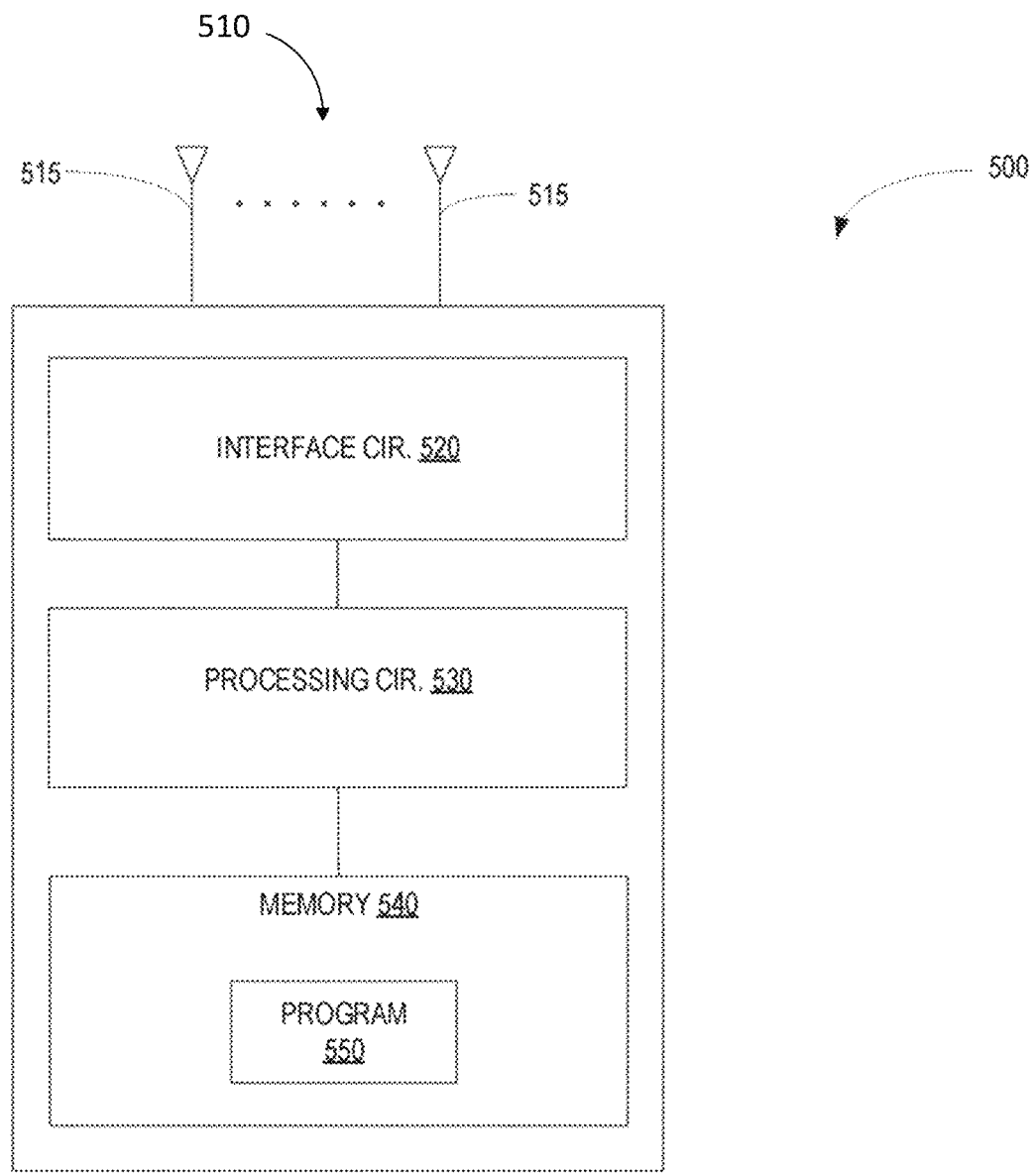
FIG. 10 illustrates the main functional elements of a UE configured to implement NAS signaling as herein described.

FIG. 10 illustrates a UE 500 according to one embodiment. The UE 500 comprises an antenna array 510 with multiple antenna elements 515, communication circuitry 520 enabling communication with one or more base stations 20 over an air interface, processing circuitry 530, and memory 540.

The communication circuitry 520 is coupled to the antennas 515 and comprises the radio frequency (RF) circuitry needed for transmitting and receiving signals over a wireless communication channel. In one embodiment, the communication circuitry 520 comprises a RF transmitter and receiver configured to operate according to the NR standard.

The processing circuitry 530 controls the overall operation of the UE 200 500 and processes the signals transmitted to or received by the UE 200 500. Such processing includes coding and modulation of transmitted data signals, and the demodulation and decoding of received data signals. The processing circuitry 530 may comprise one or more microprocessors, hardware, firmware, or a combination thereof.

Memory 540 comprises both volatile and non-volatile memory for storing computer program code and data needed by the processing circuitry 530 for operation. Memory 540 may comprise any tangible, non-transitory computer-readable storage medium for storing data including electronic, magnetic, optical, electromagnetic, or semiconductor data storage. Memory 540 stores a computer program 550 comprising executable instructions that configure the processing circuitry 530 to implement the procedures as herein described including the methods 300 and 350 according to FIGS. 4 & 5. A computer program 550 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 550 for configuring the processing circuitry 530 as herein described may be stored in a removable memory, such as a portable compact disc, portable digital video disc, or other removable media. The computer program 550 may also be embodied in a carrier such as an electronic signal, optical signal, radio signal, or computer readable storage medium.

Figure 11:
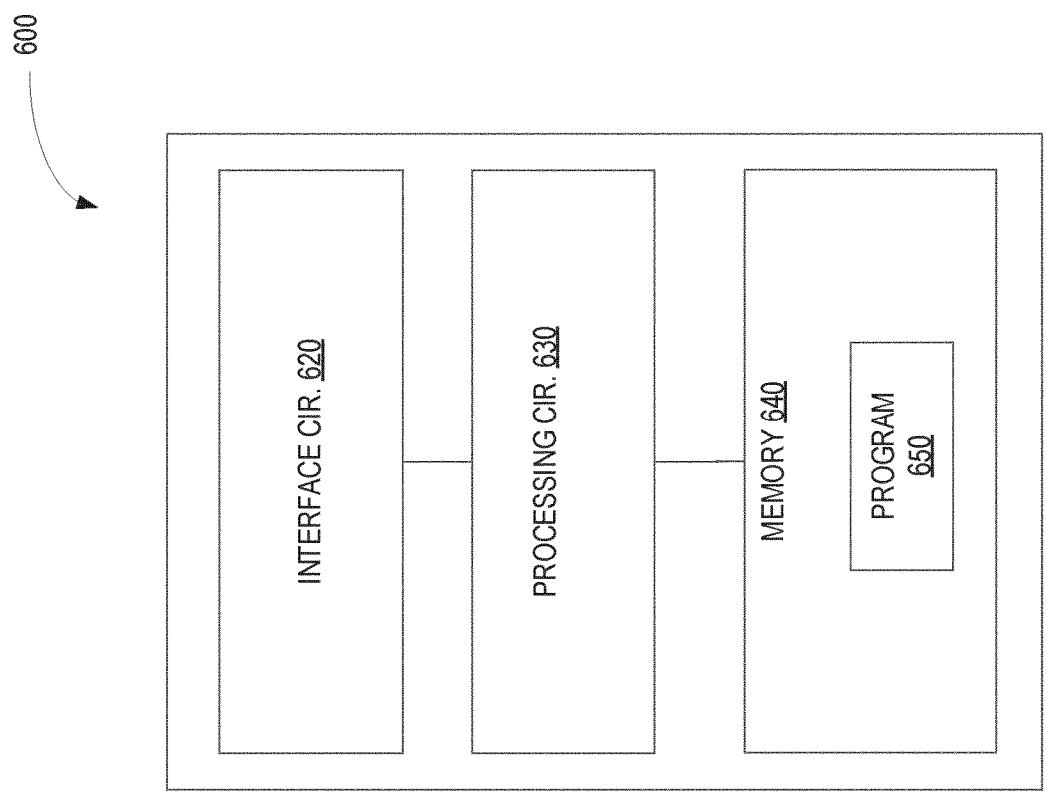
FIG. 11 illustrates the main functional elements of a network node configured to implement NAS signaling as herein described.

FIG. 11 illustrates a network node 600 according to one embodiment that may be configured to function as a base station 20 as herein described. The network node 600 comprises communication circuitry 620 enabling communication with one or more UEs 200 over the N2 interface, processing circuitry 630, and memory 640.

The communication circuitry 620 comprises a network interface circuits necessary for communicating with other network nodes in a core network and the UE 200. The communication circuitry 620 can implement a wired interface, a wireless interface, or both.

The processing circuitry 630 controls the overall operation of the network node 600 and handles mobility management of the UE 200. The processing circuitry 630 may comprise one or more microprocessors, hardware, firmware, or a combination thereof.

Memory 640 comprises both volatile and non-volatile memory for storing computer program code and data needed by the processing circuit 630 for operation. Memory 640 may comprise any tangible, non-transitory computer-readable storage medium for storing data including electronic, magnetic, optical, electromagnetic, or semiconductor data storage. Memory 640 stores a computer program 650 comprising executable instructions that configure the processing circuitry 630 to implement the procedures as herein described including the method 400 according to FIG. 6. A computer program 650 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 650 for configuring the processing circuitry 630 as herein described may be stored in a removable memory, such as a portable compact disc, portable digital video disc, or other removable media. The computer program 650 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electrical signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 12:
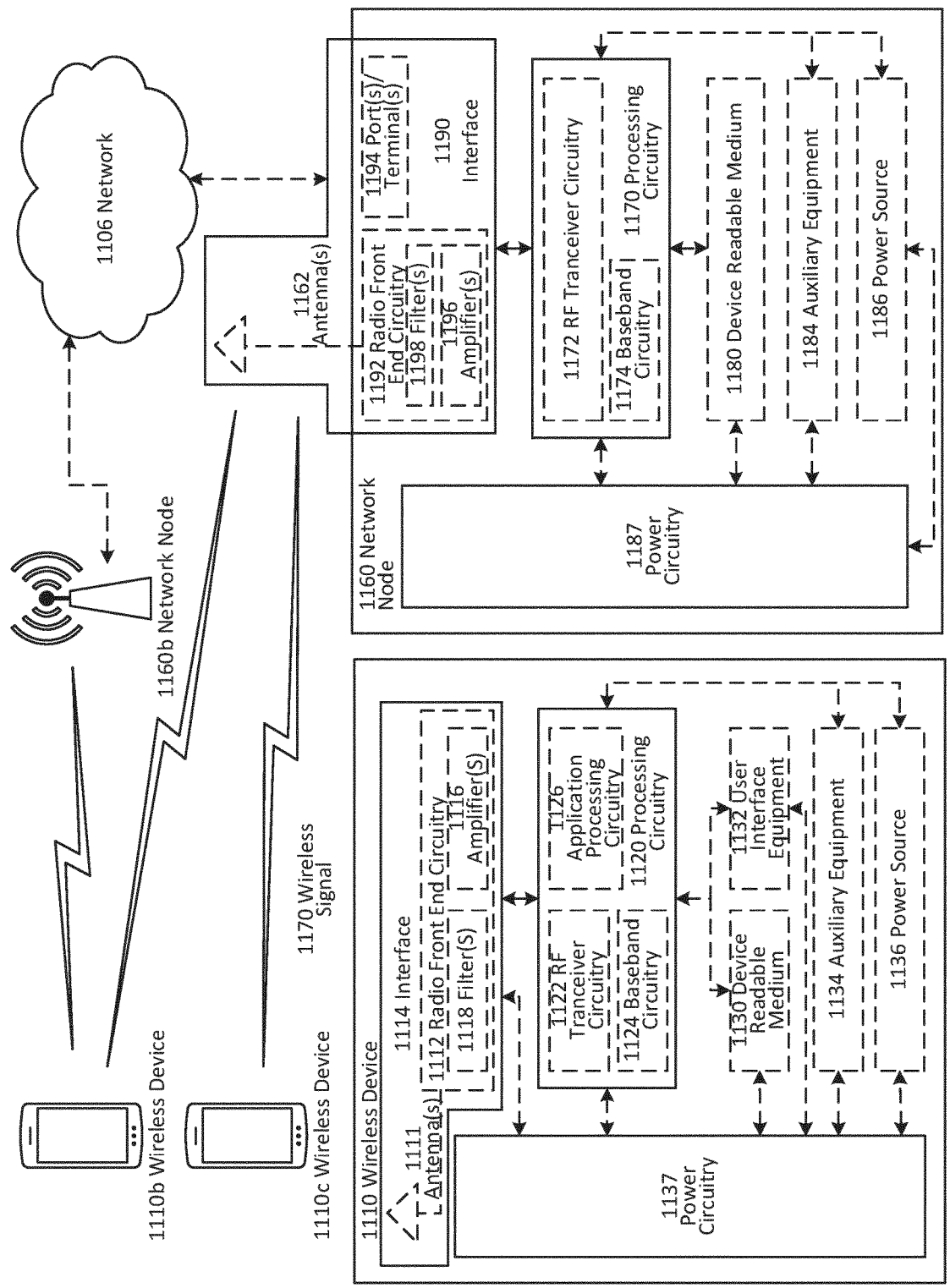
FIG. 12 is a schematic block diagram illustrating an example wireless network, according to particular embodiments of the present disclosure.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 12 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 13:
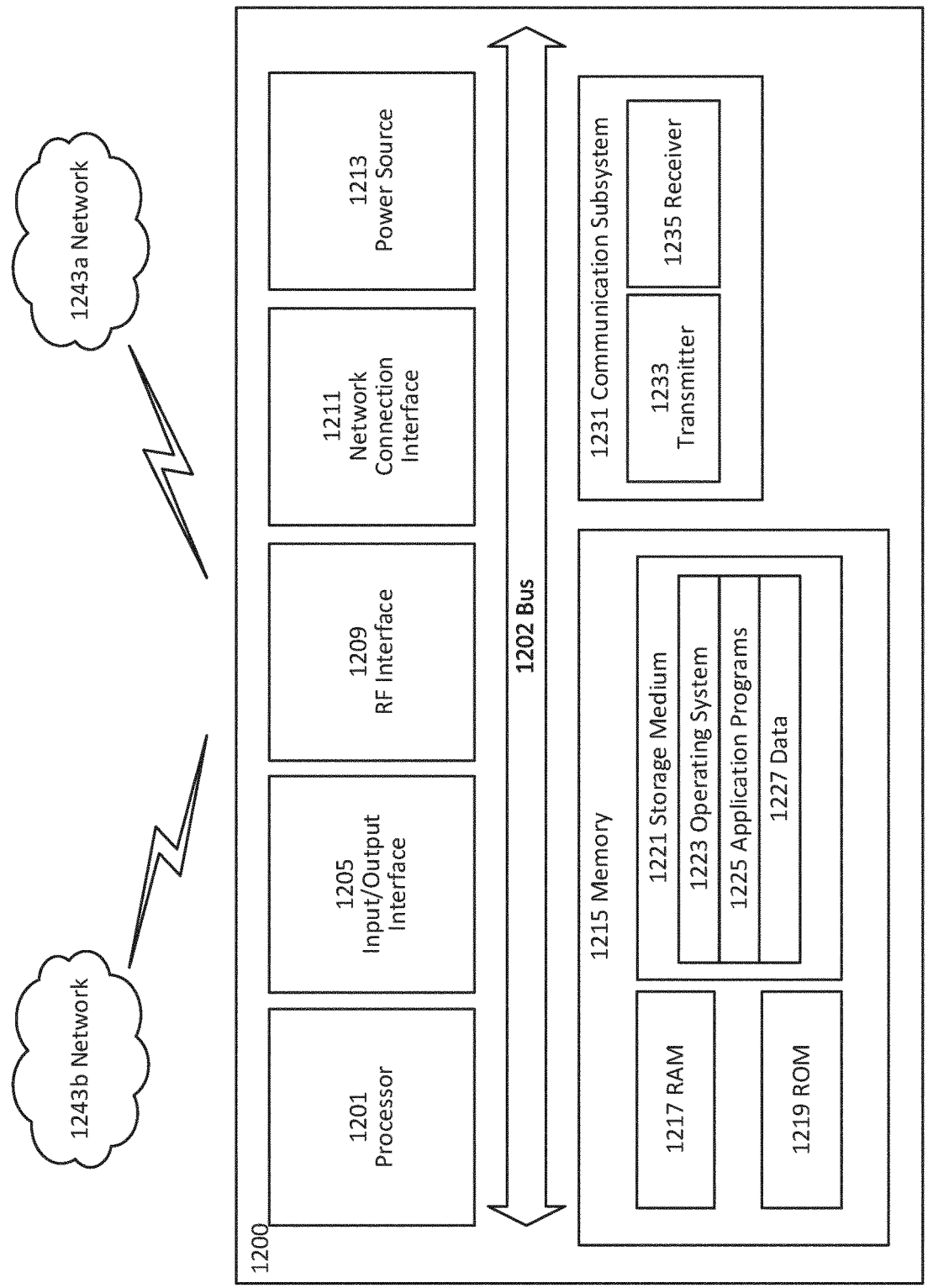
FIG. 13 is a schematic block diagram illustrating an example of a user equipment, according to particular embodiments of the present disclosure.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 13, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 13, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 14:
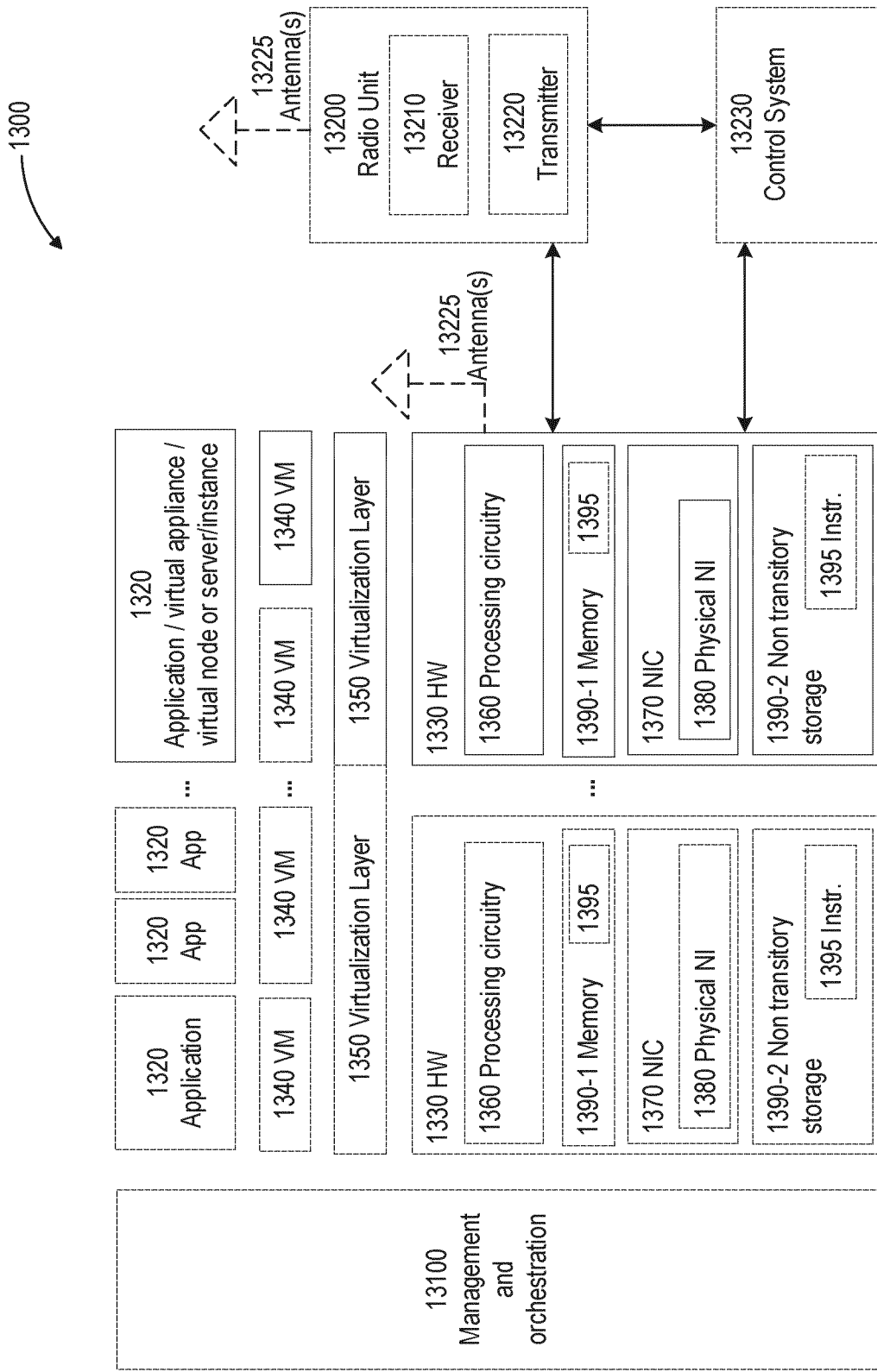
FIG. 14 is a schematic block diagram illustrating an example of a virtualization environment, to particular embodiments of the present disclosure.
Figure 15:
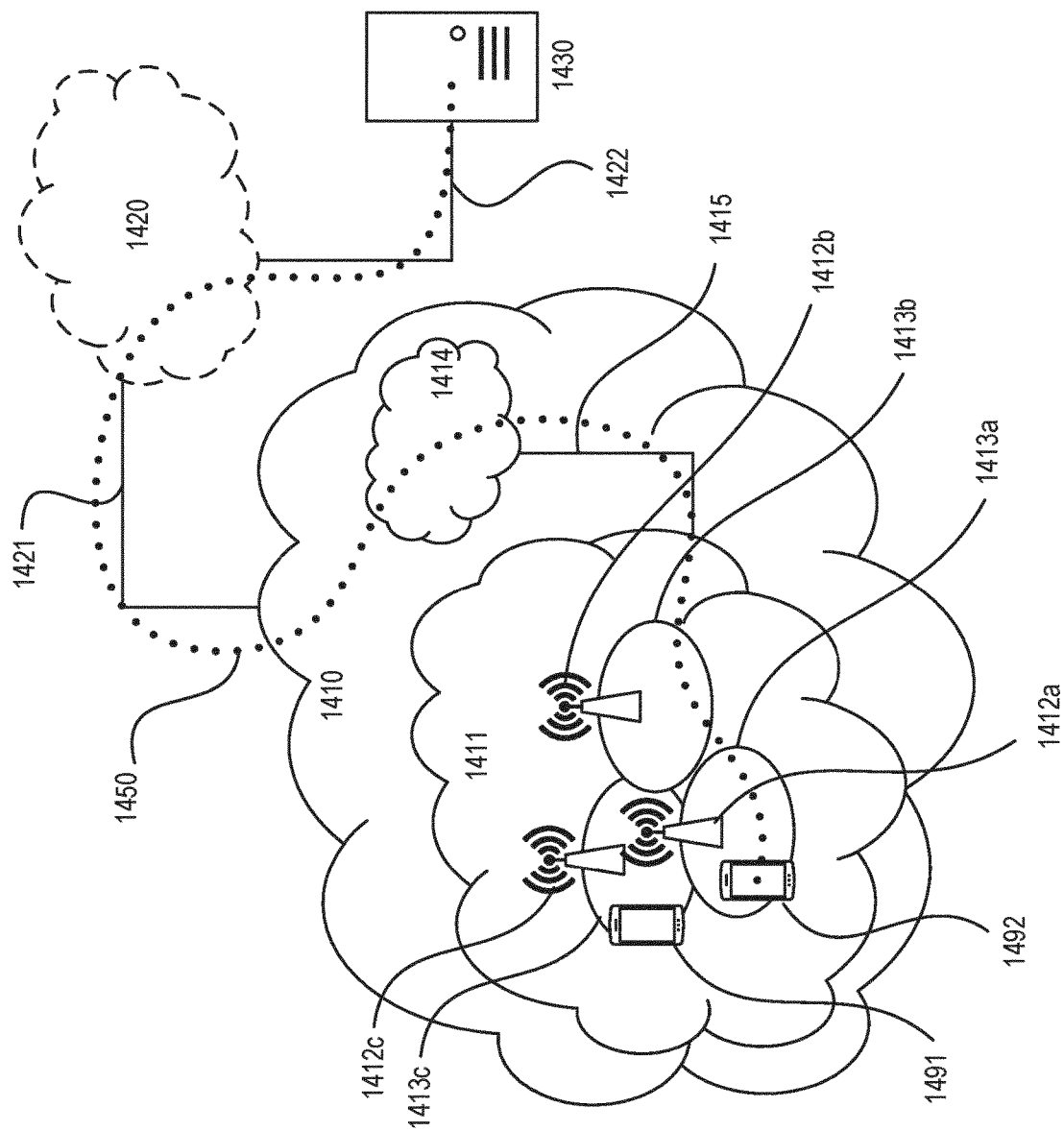
FIG. 15 is a schematic illustrating an example telecommunication network, according to particular embodiments of the present disclosure.

FIG. 14 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 14, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 14.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 16:
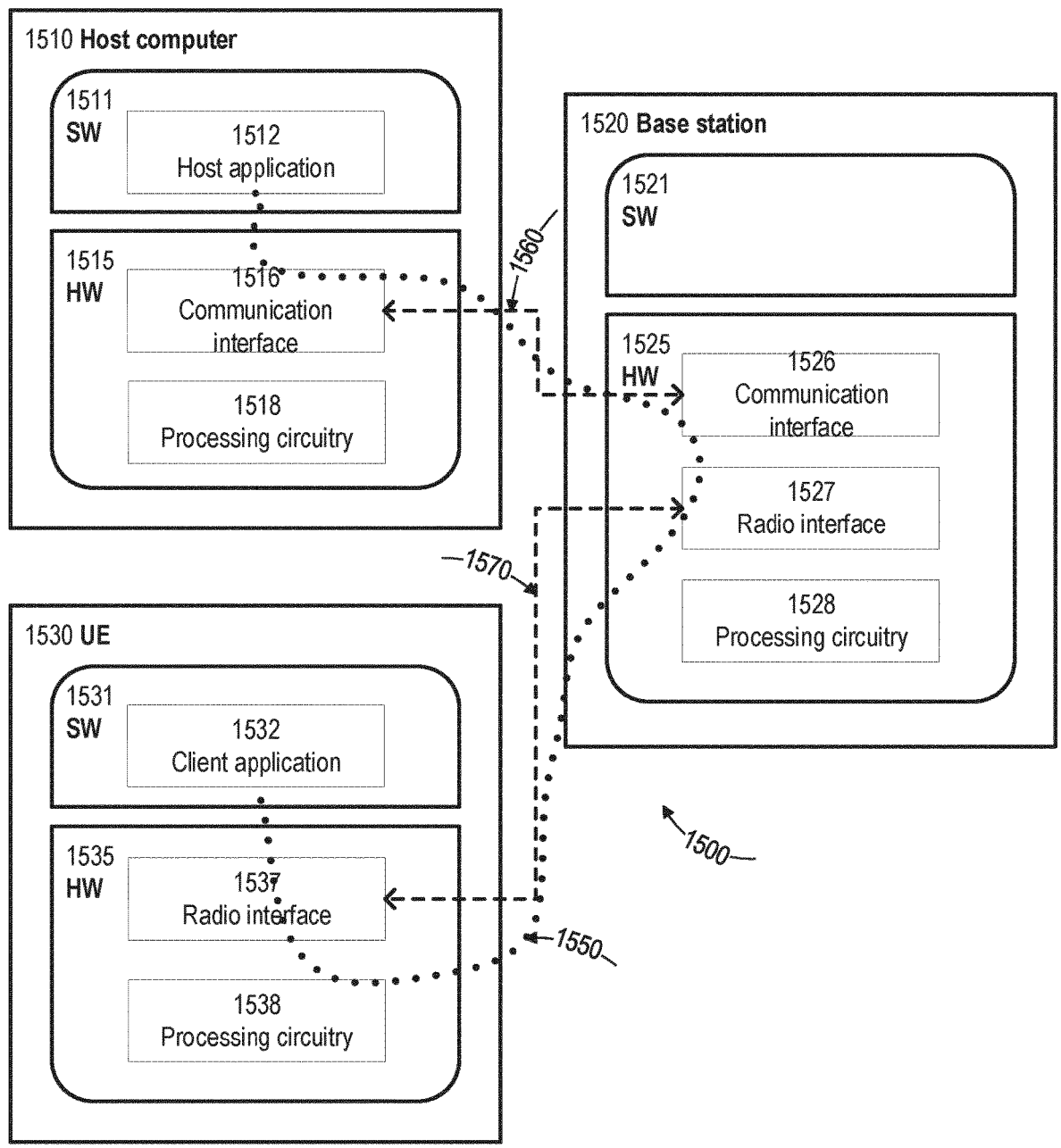
FIG. 16 is a schematic block diagram illustrating an example communication system, according to particular embodiments of the present disclosure.

FIG. 16 illustrates a telecommunication network connected via an intermediate network to a host computer in accordance with some embodiments. In particular, with reference to FIG. 16, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 16 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 17:
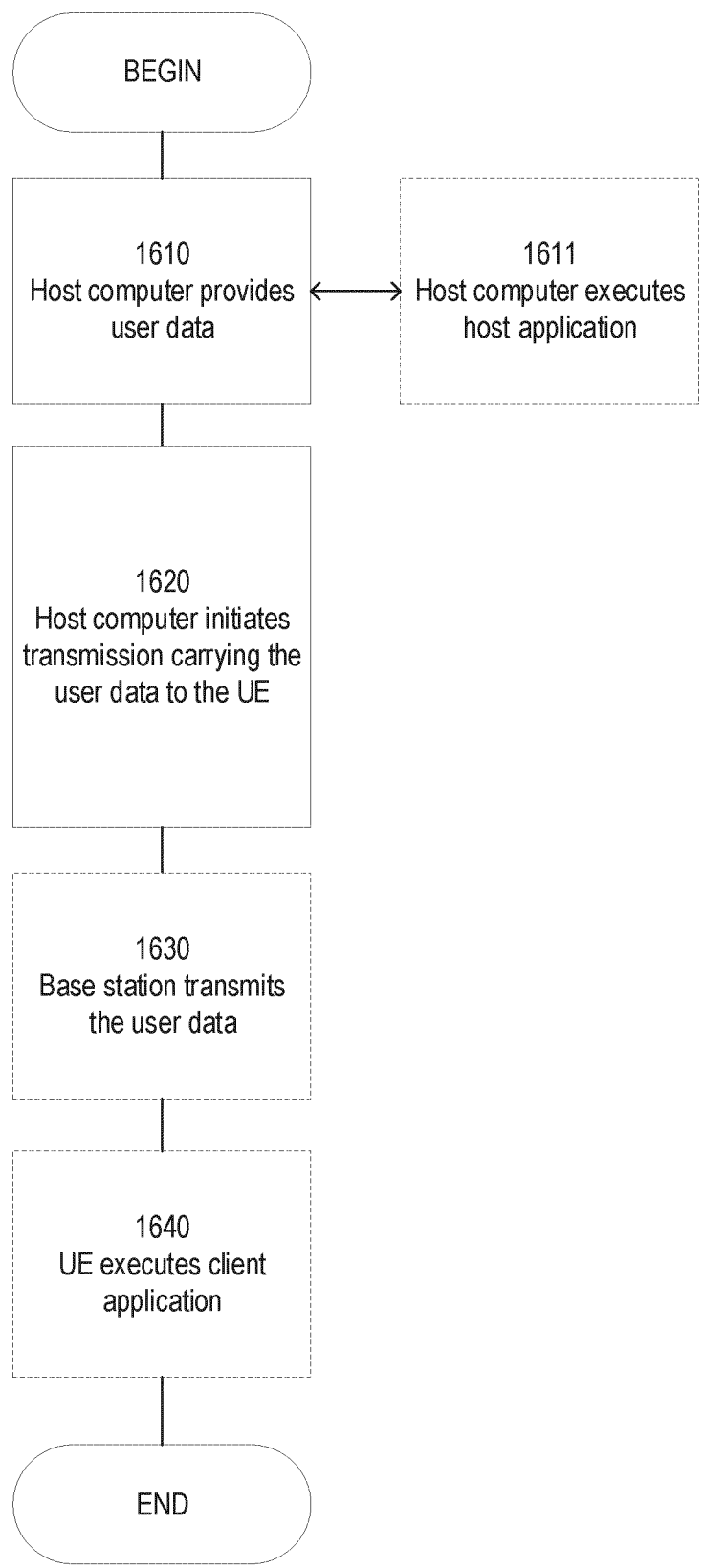
FIGS. 17-20 are flow diagrams, each of which illustrates an example method implemented in a communication system, according to particular embodiments of the present disclosure.

Example implementations, in accordance with an embodiment, of the UE, base station and host computer discussed in the preceding paragraphs will now be described with reference to FIG. 17. FIG. 17 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 17) served by base station 1520. Communication interface 1526 may be configured to facilitate connection 1560 to host computer 1510. Connection 1560 may be direct or it may pass through a core network (not shown in FIG. 17) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 17 may be similar or identical to host computer 1430, one of base stations 1412a, 1412b, 1412c and one of UEs 1491, 1492 of FIG. 16, respectively. This is to say, the inner workings of these entities may be as shown in FIG. 17 and independently, the surrounding network topology may be that of FIG. 16.

In FIG. 17, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the NAS security and latency and thereby provide benefits such as improved user experience and robustness of user communications.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 18:
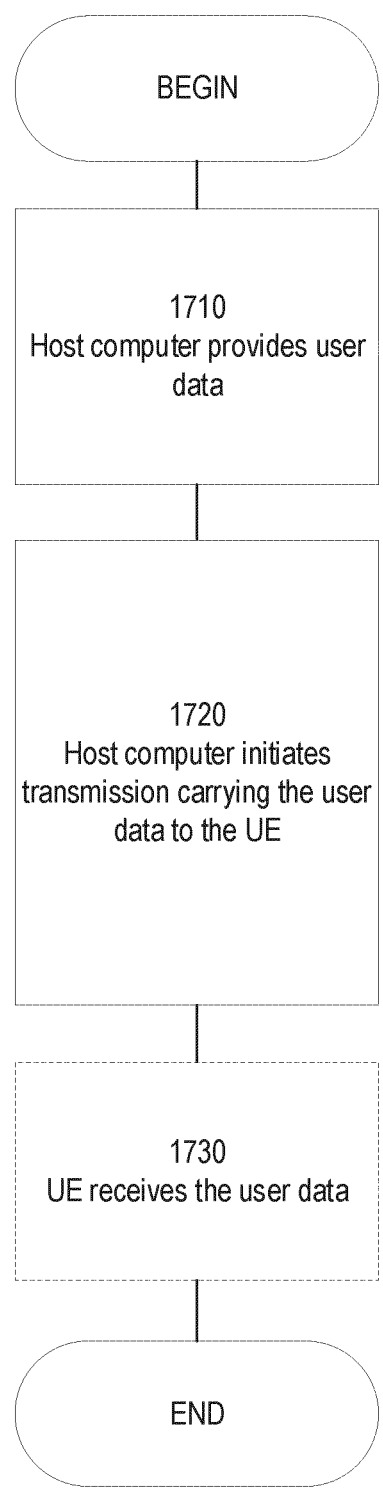

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 19:
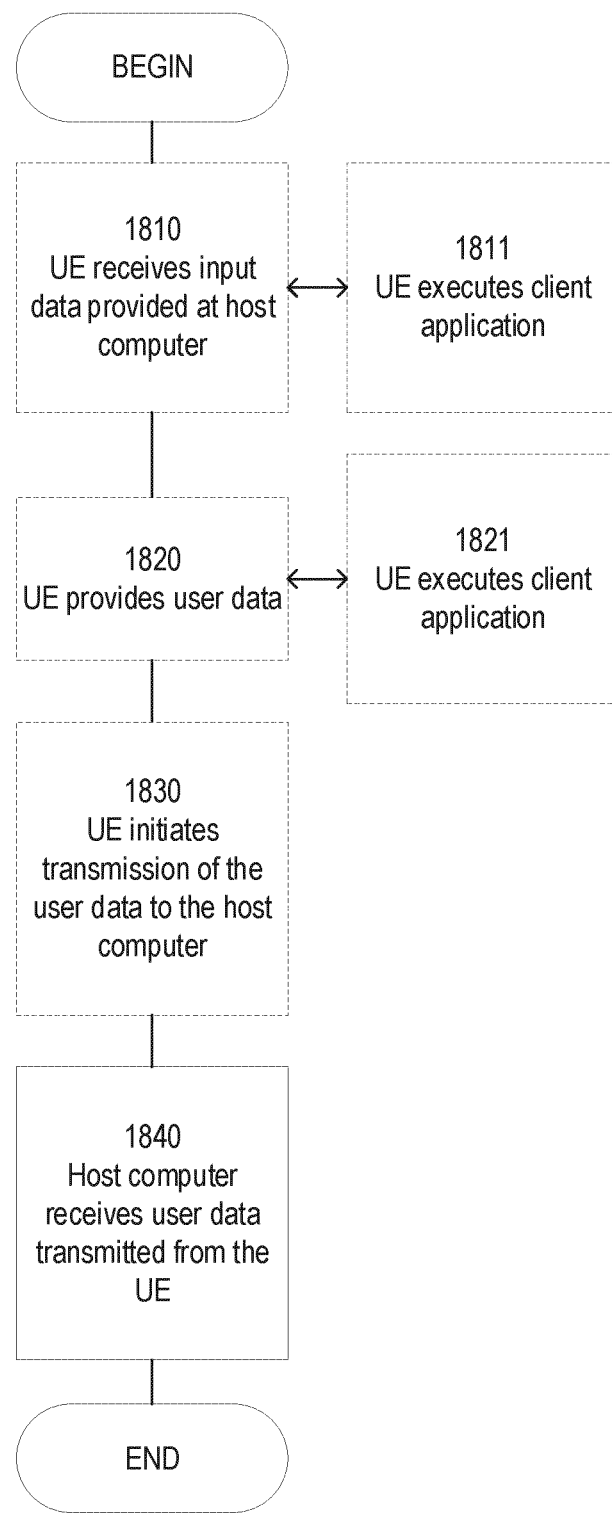

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 20:
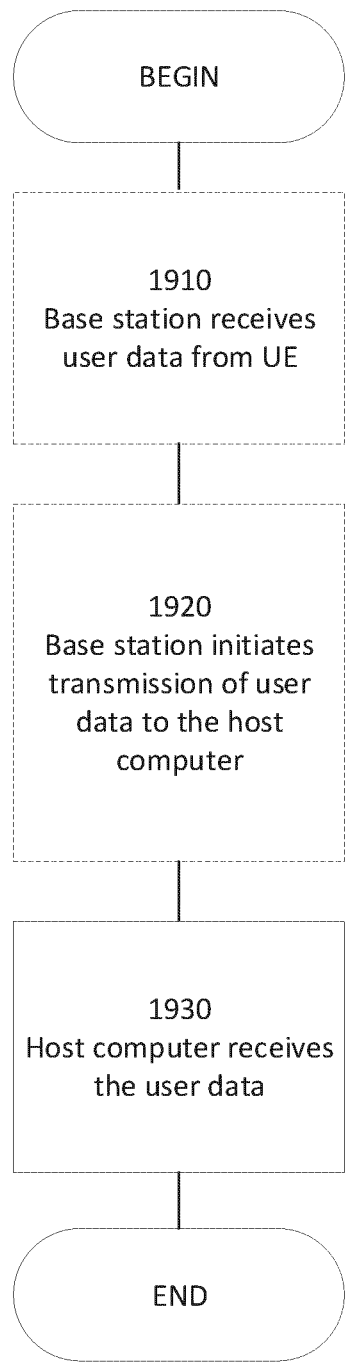

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 1810 (which may be optional), the UE receives input data provided by the host computer. Additionally, or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

FIG. 120 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 120 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method implemented by a user equipment (UE) of sending a non-access stratum (NAS) message to a core network node in a wireless communication network, the method comprising:
    determining whether a NAS request message contains a spurious information element, wherein
        the NAS request message comprises a first NAS request message with a message container containing a second NAS request message; and
        determining whether the NAS request message contains a spurious information element comprises:
            determining that the NAS request message does not contain a spurious information element by determining that a type of the second NAS request message matches a type of the first NAS request message, or
            determining that the NAS request message contains a spurious information element by determining that the type of the second NAS request message does not match the type of the first NAS request message; and
    after determining that the NAS request message does not contain a spurious information element, transmitting the NAS request message; or
    after determining that the NAS request message contains a spurious information element, refraining from transmitting the NAS request message.

2. The method of claim 1, wherein
    the first NAS request message comprises a service request message and the second NAS request message comprises a registration request message, or
    the first NAS request message comprises a registration request message and the second NAS request message comprises a service request message.

3. The method of claim 1, wherein
    the NAS request message comprises a service request message with an emergency service fallback indication; and
    determining whether the NAS request message contains a spurious information element comprises determining whether the service request message contains a spurious information element.

4. The method of claim 3, wherein the spurious information element comprises one of:
    a NAS container
    a Protocol Data Unit (PDU) Session Status Information Element, IE;
    an Uplink Data Status IE;
    an Allowed PDU Session Status IE; or
    an optional IE.

5. A method implemented by a user equipment (UE) in a wireless communication network of sending a non-access stratum (NAS) message to a core network node in a wireless communication network, the method comprising:
    transmitting a first NAS request message to a core network node in the wireless communication network, wherein the first NAS request message includes a NAS message container with an encapsulated NAS request message;
    receiving, responsive to the first NAS request message, a NAS response message from the core network node comprising an error indication indicating that the core network node has determined that the first NAS request message is an erroneous NAS request message, wherein the error indication indicates that the core network node has identified a type mismatch between the first NAS request message and the encapsulated NAS request message; and
    transmitting, responsive to the error indication, a second NAS request message that is different than the first NAS request message.

6. A method implemented by a core network node in a wireless communication network of receiving non-access stratum (NAS) messages, the method comprising:
    the core network node receiving, from a user equipment (UE) a NAS request message, wherein the NAS request message comprises a first NAS request message with a message container containing a second NAS request message;
    the core network node determining that the NAS request message contains a spurious information element (IE), wherein the core network node determining that the NAS request message contains a spurious IE comprises determining a type of the second NAS request message does not match a type of the first NAS request message; and
    as a result of determining that the NAS request message contains a spurious IE, the core network node processing the NAS request message according to a handling procedure that is different than a handling procedure used to process NAS requests messages that contain no spurious IE.

7. The method of claim 6, wherein
    the core network node processing the first NAS request message according to the handling procedure comprises processing the first NAS request message while ignoring or discarding the NAS request message container, and
    the first NAS request message comprises a registration request message and the second NAS request message comprises a service request message or the first NAS request message comprises a service request message and the second NAS request message comprises a registration request message.

8. The method of claim 6, wherein the core network node processing the first NAS request message according to the handling procedure comprises ignoring or discarding the first NAS request message.

9. The method of claim 6, wherein the core network node processing the first NAS request message according to the handling procedure comprises sending, to the UE, a NAS response message with an error indication, and the error indication indicates a type mismatch between the first NAS request message and the second NAS request message.

10. The method of claim 6, wherein
the NAS request message comprises a service request message with an emergency service fallback indication; and
determining that the NAS request message contains a spurious IE comprises determining the service request message contains a spurious IE.

11. The method of claim 10, wherein the spurious information element comprises:
a NAS container;
a Protocol Data Unit, PDU, Session Status Information element, IE;
an Uplink Data Status IE;
an Allowed PDU Session Status IE; or
an optional IE.

12. The method of claim 10, wherein processing the service request message according to the handling procedure comprises:
processing the NAS request message while ignoring or discarding the spurious information element or ignoring the service request message.

13. The method of claim 10, wherein processing the service request message according to the handling procedure further comprises sending, to the UE, a response message with an error indication.

14. The method of claim 10, further comprising logging the service request message in an event log.

15. A user equipment in a wireless communication network, the user equipment (UE) comprising:
communication circuitry configured for communication via a base station with a core network node; and
processing circuitry configured to cause the UE to perform the method of claim 1.

16. A user equipment in a wireless communication network, the user equipment (UE) comprising:
communication circuitry configured for communication via a base station with a core network node; and
processing circuitry configured to cause the UE to perform the method of claim 5.

17. A core network node in a wireless communication network, the core network node comprising:
communication circuitry configured for communication with a user equipment (UE) via a base station in the wireless communication network; and
a processing circuitry configured to cause the core network node to perform the method of claim 6.

* * * * *